(12) United States Patent
Tagg et al.

(10) Patent No.: US 9,774,742 B2
(45) Date of Patent: *Sep. 26, 2017

(54) CALL RECORDING IN A TELECOMMUNICATIONS NETWORK

(71) Applicant: Truphone Limited, London (GB)

(72) Inventors: James Tagg, Kent (GB); Timothy Paul Evans, Berkshire (GB); Igor Borisoglebski, Alcabideche (PT); James Edward Body, Wiltshire (GB); Edward Thomas Guy, III, Chatham, NJ (US)

(73) Assignee: Truphone Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,509

(22) Filed: Aug. 3, 2015

(65) Prior Publication Data

US 2015/0341490 A1 Nov. 26, 2015

Related U.S. Application Data

(63) Continuation of application No. 14/131,202, filed as application No. PCT/GB2012/052825 on Nov. 14, 2012, now Pat. No. 9,131,055.

(30) Foreign Application Priority Data

Nov. 14, 2011 (GB) .................................. 1119628.4

(51) Int. Cl.
  *H04M 3/42* (2006.01)
  *H04M 3/533* (2006.01)
  (Continued)

(52) U.S. Cl.
  CPC ....... *H04M 3/533* (2013.01); *H04M 3/42221* (2013.01); *H04M 3/543* (2013.01);
  (Continued)

(58) Field of Classification Search
  CPC ..... H04M 2203/2022; H04M 2207/12; H04M 2207/182; H04M 3/533; H04M 3/543; H04M 3/42221; H04W 4/12; H04W 4/16
  (Continued)

(56) References Cited

U.S. PATENT DOCUMENTS 5,754,639 A * 5/1998 Flockhart ............ H04M 3/5232
  379/111
2002/0155847 A1 10/2002 Weinberg
  (Continued)

FOREIGN PATENT DOCUMENTS

JP  H11-98544    4/1999
JP  2000-134206  5/2000
  (Continued)

*Primary Examiner* — Wayne Cai

(57) ABSTRACT

A method of recording media transmitted to or from a first party communicating through one of a plurality of mobile telecommunications networks with a second party is described. Either the first party or the second party initiates a call with the other party. One of a set of call splitters distributed through the plurality of telecommunications networks is then determined to be a local call splitter to one of the parties. A connection is then established between the first party and the local call splitter to split the call into a recording part and a call part. The call part is routed between the first party and the second party via the call splitter to provide transmission of media between the first party and the second party, and the recording part is provided by the local call splitter to a recording service associated with the first party. Suitable apparatus is also described, as are methods for recording the calls of a subscriber to a central recording station using a network trigger set or a SIM application set to divert the call to a recording node.

2 Claims, 7 Drawing Sheets

(51) Int. Cl.
  *H04W 4/16* (2009.01)
  *H04M 3/54* (2006.01)
  *H04W 4/12* (2009.01)

(52) U.S. Cl.
  CPC ............... *H04W 4/12* (2013.01); *H04W 4/16* (2013.01); *H04M 2203/2022* (2013.01); *H04M 2207/12* (2013.01); *H04M 2207/182* (2013.01)

(58) Field of Classification Search
  USPC ................ 455/413, 414.1, 412.1–412.2, 417
  See application file for complete search history.

(56) References Cited

U.S. PATENT DOCUMENTS

2003/0138095 A1\* 7/2003 Stroud ................ H04Q 3/0029
                                                                 379/230
2010/0183001 A1   7/2010 Fujimoto et al.

FOREIGN PATENT DOCUMENTS

| JP | 2002-330223 | 11/2002 |
| JP | 2004-173051 | 6/2004 |
| JP | 2010283576 | 12/2010 |
| WO | WO2009044472 | 4/2009 |

\* cited by examiner

CALL RECORDING IN A TELECOMMUNICATIONS NETWORK

CROSS REFERENCE TO RELATED APPLICATIONS

This application is a continuation application of U.S. application Ser. No. 14/131,202, filed on Jan. 6, 2014. That application claims priority to international application number PCT/GB2012/052825 filed on Nov. 14, 2012 which claims priority to British patent application number 1119628.4 filed on Nov. 14, 2011, the entire disclosures of which are hereby incorporated by reference.

FIELD OF THE INVENTION

The invention relates to telecommunications, and specifically to the recording of voice calls over a telecommunications network. It has particular benefits where one or more of the parties in the call uses a mobile telecommunications device.

BACKGROUND TO THE INVENTION

There are several circumstances that require the recording of phone conversations. These circumstances typically address one of three purposes: lawful intercept, personal note taking, and non-repudiation of contracts.

Providing non-repudiation of verbal agreements and recording of conversations that might result in a financial transaction to avoid issues of insider dealing has been mandated by government regulation in several countries. The financial industry particularly has this requirement. Lawful intercept has different considerations, and will typically be carried out by authorities (police or security services) in the relevant jurisdiction. These authorities will typically have some form of privileged access to a network, rendering the technical considerations involved in lawful intercept somewhat different from those involved in recording of conversations by a private party such as a bank (even if this voice recording is required to meet a legal obligation).

While calls to and from fixed office phones can be intercepted and recorded using local switch or private branch exchange (PBX) features, the position is much more complicated when a relevant subject (hereafter termed "subscriber") uses a mobile phone, call recording is much more involved.

The mobile recording problem is partially addressed by providing a two stage dialing service. The mobile subscriber originates calls into an appropriate service (this may be a feature in their office PBX, for example). This service prompts for a second number to be called using a send call leg. The voice call (or other "media" in the call) from both call legs passes through the PBX and is recorded. Calls terminated to the mobile subscriber must return via the same path. Typically, the mobile terminated calls are made via some form of automated call forwarding or diversion, but a two-stage dialer such as used for the mobile originations may also be used.

There are several problems with this two stage dialing approach. Firstly, it requires the subscriber to behave in a different way compared to their behaviour in a conventional call. Secondly, if the subscriber wishes to have a call that is not recorded, they can simply bypass this procedure by dialling directly. Thirdly, a caller can simply call the mobile's number directly, again bypassing the recording service (unless the mobile number is disabled for incoming calls at least.)

To address these objections in part at least, mobile terminals, particularly "smart phones," have been programmed to automate the two-stage dialing and to intercept the normal call progression. However, such applications are easily bypassed, disabled, or the equipment changed. Moreover, direct mobile call termination is not addressed. Additional problems occur. The call set up path and the onward path to the B party require independent signalling processes. It is often the case that timing mismatches occur between the two signalling paths and this can cause either long call setup times or frequent failed call set ups.

Lawful intercept solutions may involve making a copy of media that is split between a recording device and the destination using in-region recorders are used. This is not desirable for a commercial application, where it is desired to use one home recording service for all recording regardless of where the person has travelled to in the world. Lawful intercept is also different in that it does not provision a services to subscribers or employers of subscribers—it operates under specific restraints (it typically must not interfere with the call if it cannot be recorded) and it will not involve provision of an announcement made to either caller.

A better solution to these concerns can be made by using features of the intelligent network associated with the relevant telecommunications backbone—these may be used to give a service controller the opportunity to redirect the call path to the call recorder. On a GSM network, for example, the set of triggers, detection points, and associated architecture that can be used is referred to as "CAMEL" ("Customised Applications for Mobile Networks Enhanced Logic", defined by a set of standards specified in ETSI TS 123 078). The subscriber cannot bypass this type of automated feature as it resided within the network and is a part of that network. The subscriber handset, often labelled 'User Equipment' (UE) in these standards, is unaware of the process going on.

Within a country or region, such a network-controlled divert to a call recorder can perform well. Over great distances, particularly intercontinental distances, a call path which routes back to the home office and then out again to another part of the world may have objectionable media delay resulting in an unacceptable call experience. If we were to record a call in the London office of a user while they were travelling in Australia the audio delay on the call could be over 1 second. Toll quality voice really needs less than 250 ms maximum and ideally 150 ms or less to allow people to engage in normal dialogue with the natural interruptions that this entails. It is desirable to address the problems of the prior art to find an effective solution to the recording of voice calls.

SUMMARY OF INVENTION

In a first aspect, the invention provides a method of recording media transmitted to or from a first party communicating through one of a plurality of mobile telecommunications networks with a second party, the method comprising: either the first party or the second party initiating a call with the other party; determining one of a set of call splitters distributed through the plurality of telecommunications networks to be a local call splitter to the first or the second party; establishing a connection between the first party and the local call splitter to split the call into a recording part and a call part, wherein the call part is routed between the first party and the second party via the call splitter to provide transmission of media between the first party and the second party, and wherein the recording part is provided by the local call splitter to a recording service.

By "local call splitter", it is meant that the call splitter is suitably located to achieve effective call quality. For preference, the call splitter will be the one of the set that is optimally located between the first and second party so as to maximise call quality—this may be by minimising call latency but may also take cost and quality and other parameters into account as well)

In the example discussed below with reference to FIG. 1, a person who is recorded by a service located in London might travel to Australia. They desire to make a call to a local number. The call would, in fact, be transmitted to a splitter box located in Sydney, or some other reasonable location such as the regional fall back centre in Hong Kong. The first split of the call would go to the local number while the second split of the call would route to the London recording service.

The transmitted media may comprise a voice, video or other time critical call type or even a data session for data that has a time critical nature. The approach is particularly advantageous in the recording of voice calls where the calling party, and called party, are sufficiently distant from the recording service that the addition of a recording device in the call path introduces delay sufficient to impede communications. The same arguments apply to stream data and data services that need fast access. The forcing of each and every transition to route via a long distance path for recording purposes even though the data source and data consuming device are close makes many user experiences unacceptably slow Determining one of a set of call splitters to be a local call splitter may be carried out by a service node of a home mobile telecommunications network for the first party.

Advantageously, the home mobile telecommunications network notifies the local call splitter by intelligent network signalling. In preferred embodiments, the home mobile telecommunications network is a GSM network and the intelligent network signalling comprises CAMEL messages.

Announcements may be added to the call part to notify one or both of the first and second parties that the call is recorded.

The first party may be a calling party initiating the voice call. If so, on initiating the call, a messaging service centre of the mobile telecommunications network to which the first party is attached may notify a service point of that mobile telecommunications network, which notifies the service point of the first party's home mobile telecommunications network.

The first party may be a called party receiving the voice call. If so, on initiation of the call, the messaging service centre of the first party's home mobile telecommunications network may notify the local call splitter while establishing the call to a mobile telecommunications network visited by the first party.

Preferably, the recording service continually notifies the local call splitter of successful recording. If desired, on failure of successful recording, the call is terminated.

In a further aspect, the invention provides a media recording service adapted to perform the method described above.

In a still further aspect, the invention provides a service control point of a mobile telecommunications network adapted to determine a local call splitter from a plurality of call splitters for a subscriber to that mobile telecommunications network currently roaming on another network.

In a yet further aspect, the invention provides a method for recording the calls of a subscriber to a central recording station using a network trigger set to divert the call to a recording node. In a yet further aspect, the invention provides a method for recording the calls of a subscriber to a central recording station using a SIM application set to divert the call to a recording node.

BRIEF OF DRAWINGS

Specific embodiments of the invention will be described below, by way of example, with reference to the accompanying drawings, of which:

DETAILED DESCRIPTION OF PREFERRED EMBODIMENTS

Figure 1:
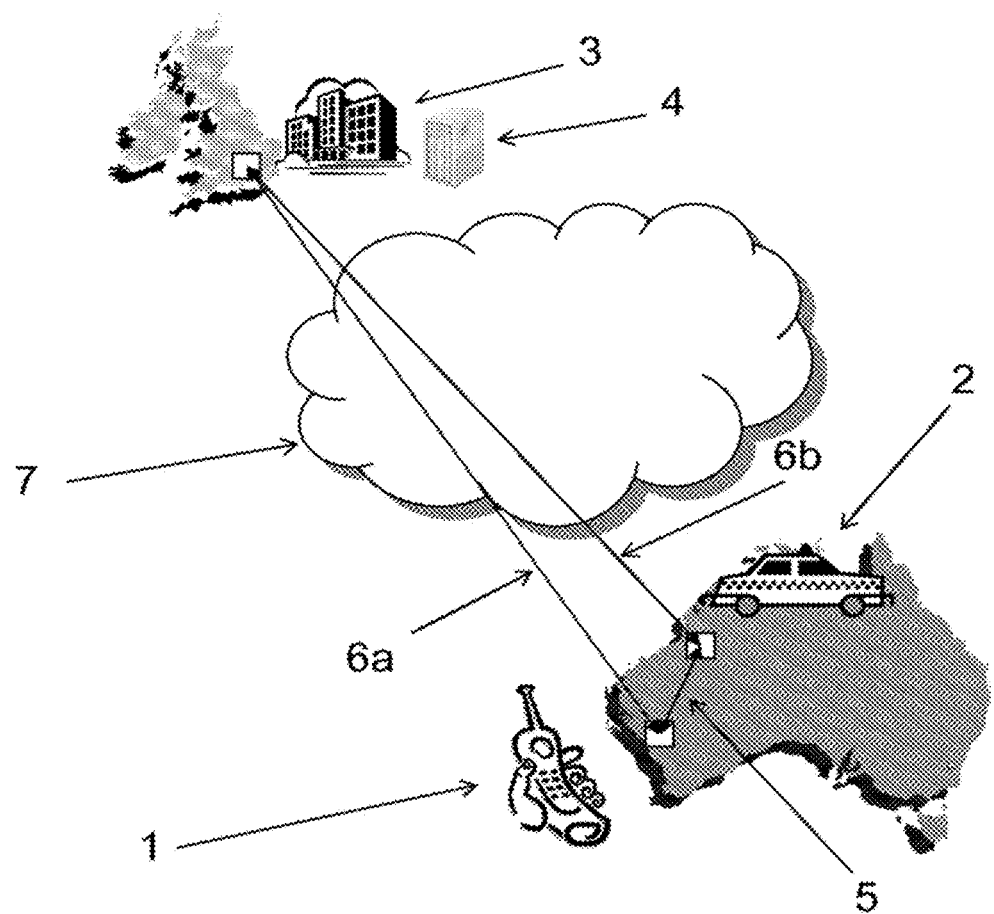
FIG. 1 illustrates a scenario to which embodiments of the invention are particularly applicable.

An illustration of the basic problem is provided in FIG. 1. An organization that needs to record media centrally in relation to a particular subscriber has a problem if that subscriber travels around the world. The most obvious solution is to provide a central recording machine—however, if all media must transit back to this point, be recorded and then transit back to the termination point this will put a large delay into the call path. A person 1 travelling in Australia from their home office 2 in the UK may then call a local number, for example an Australian taxi firm 3, effectively by the process of calling the UK head office (for call recording at recording server 4), which will then call back to the taxi firm in Australia. This means that what would otherwise be a simple local call 5 involves two legs 6a and 6b through multiple networks 7 extending around the world. This round trip delay will add an unacceptable audio latency into the call path.

Figure 2:
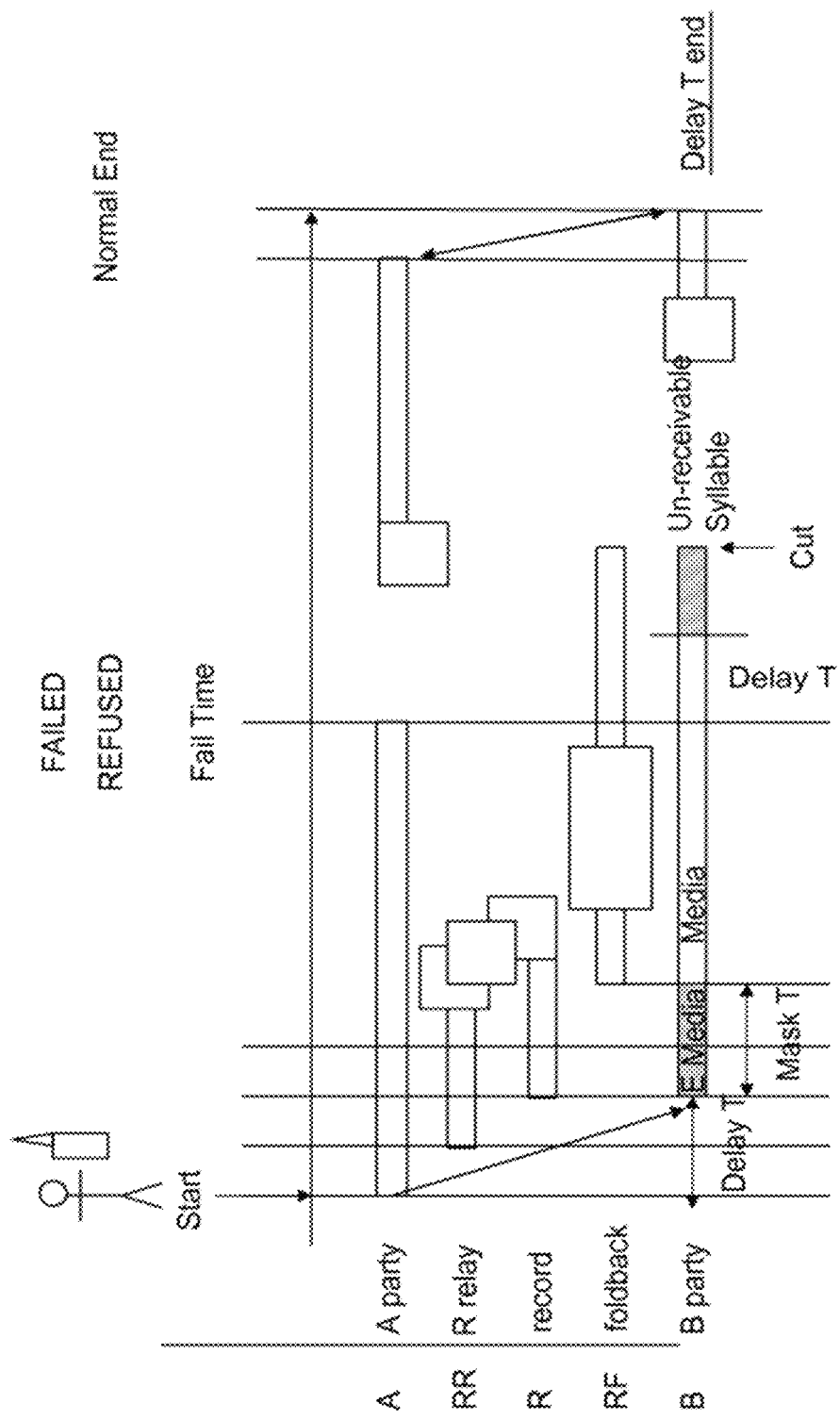
FIG. 2 illustrates the contrast between a prior art approach to the scenario of FIG. 1 and the proposed invention.

This prior art approach and the improvement of the proposed invention is shown in FIG. 2. Party A initiates a call intended for party B. In the prior art the call routes to the recorder and is then made back (foldback RF) to the party B—as can be seen this results in a severe latency if the individual delay times are significant. But if the call is transferred to the record relayed (RR) which splits one leg back to the geographically remote recording device (R)—while sending the other part direct to party B the delay time is reduced to 'Delay T from the otherwise unacceptable 'Delay T+'Mask T. Mask T is a period where it may optionally be the case that the call is forwarded with the information masked by a tone or silence until the fold back is complete, thereafter the audio is enabled. If the call fails (for example, as shown) there may be a gap until this is recognised by the relay unit and this tears down the direct path but at worse this should only allow one syllable of audio to be transmitted that was not recorded and is not commercially significant, whereas the delay might render the call unacceptable.

An alternative would be to put a recording unit in every country or region that the user may be expected to travel. This would be expensive both to deploy and to manage. There may also be regulatory difficulties—some regulators mandate that audio recording may only take place in the regulated country so such a distributed solution may not be deployed.

Embodiments of the present invention avoid these problems and provide assured call recording that requires no additional user interaction while routing calls over a short path. This can be achieved by using a system comprising a service platform (IN) that receives call attempt notifications from a serving mobile switching center (MSC) via the Home Public Land Mobile Network (HPLMN), a plurality of call splitters (CS) that control and send copies of the call media to both the local termination and to the call recorder, as well as the call recorder itself. It is not difficult to place these call splitters at auspicious locations around an extended network (such as a collection of mobile networks extending across the globe, as only a small relay splitter is required. When a call is originated or terminated, the IN receives a trigger, analyzes the call entry point and the geographic location of the associated termination gateway, selects a call splitter that provides the best performance based on the geographic area, then routes the call to the chosen call splitter. The call splicer provides ring-back or other call progress indications while the connection to the call recorder is established. Once the recording is established, a warning message may be played, and a call leg to the intended destination is established. This splitter sends a copy of the audio back to the central base for recording at a recording server. The central base then sends either the media, or a 'recording' pulse, back to the relay splitter or its associated server as a Record feedback stream. The original audio does not take this route, as the relay splitter sends the original audio directly to party B. If the Record feedback stream fails then the call may be terminated. In embodiments, the relay server may play local audio announcements within the media path which are held locally in the relay server and do not need to be accessed on each occasion from the home server. Preferably, the home server holds a bank of these messages which are pushed out and synchronised with the relays to optimally manage the system.

In one preferred embodiment network based CAMEL triggers are used to divert the media path to a recording splitter server. CAMEL capable GSM Mobile networks are widely available throughout the world. The primary use of CAMEL is to implement voicemail and customer service numbers and to provide prepay services—a similar approach can be used here. A typical implementation is in dialling a short code for voicemail—using CAMEL, the serving GSM network asks the home GSM network what it should do via a CAMEL trigger. The home network replies YES if the call is allowed and provides a continuation number indicating where the call should be routed. This continuation number might be a long number in e164 format such as '+447408800123'. The roamed to network will substitute this number for '123' and so will make a valid call to a valid number. Behind this number is a server—such a server can be used to do a number of things with the call. In the call recording case, calls may be made to a local number attached to the closest call recording capable node in a network. This call relay box then splits the call. A copy of the call transits to the record network and once recording is established the direct call is allowed.

This approach solves two problems. Firstly, the audio path may be made as direct as reasonably possible. As media splitters are inexpensive, they can be sited throughout the world and deployed as needed. Secondly, since the copy of the audio goes back to the recording server and is relayed back to the splitter, that splitter can be in no doubt that the media was recorded. If the recorded stream fails, then the direct call is broken. Using this approach, the worst case is that 200-300 ms of audio off the end of the call may not have been recorded—in practice, any speech that was in transit at the point of failure, if it is the return path that failed, will in fact be recorded so in 50% of instances even this final part of the audio is saved. However, as the information content of speech is highly redundant, it is very unlikely that any significant information will be lost. Much more critical is that speakers are very sensitive to delays in the channel which affect their speaking cadence—this approach prevents such delays from arising. This asymmetry between the issues of delay and the actual content of the speech explain why this method is very effective. Additionally, it should be noted that in this approach the subscriber will have no way to cause a recording failure—such a failure would be from the point of view of the subscriber a random event and so could not be relied upon in any way to mask activity. Further any speech that was in transit at the point of failure if it is the return path that failed will be recorded so in 50% of instances even this few fraction of a word will have been recorded. Specific embodiments of the invention will be described in more detail with reference to FIGS. 3 to 6. For the purposes of illustration below, the subscriber is shown to be using a GSM network with intelligent network services provided by CAMEL, and the home office is shown as connecting to a conventional PSTN network. It should be noted that these choices are exemplary, and the approaches set out here can be employed with other telecommunications network technologies. Extension to additional technologies is discussed briefly further below.

Figure 3:
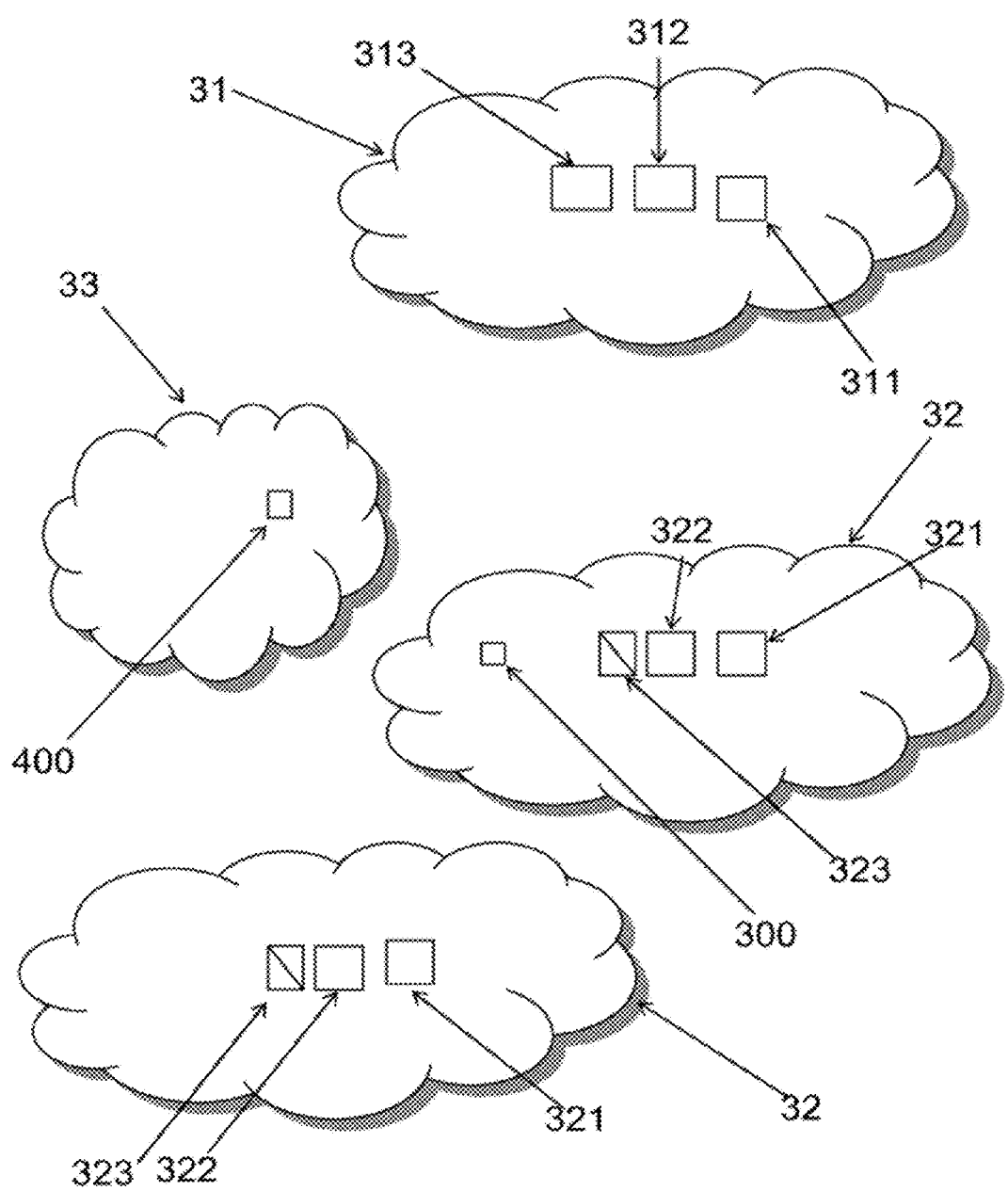
FIG. 3 illustrates elements of a set of telecommunications networks in which an embodiment of the present invention is implemented.

FIG. 3 illustrates the elements of an extended telecommunications network adapted for use with embodiments of the invention. A home public mobile network (HPLMN) 31 contains mobile switching centre 311 and an intelligent network service control point (SCP) 312. A call recording service is provided by a call recording server 313 associated with SCP 312. Other mobile networks 32 may be visited networks (VPLMNs) for the subscriber 300—each visited network has its own mobile switching centre 321 and SCP 322. Each VPLMN is here shown with a call splitter 323—this is for convenience of illustration, as a VPLMN may have none, one or several call splitters in embodiments of the invention. The other party 400 to a call is here shown as connected to a conventional PSTN 33.

Figure 4:
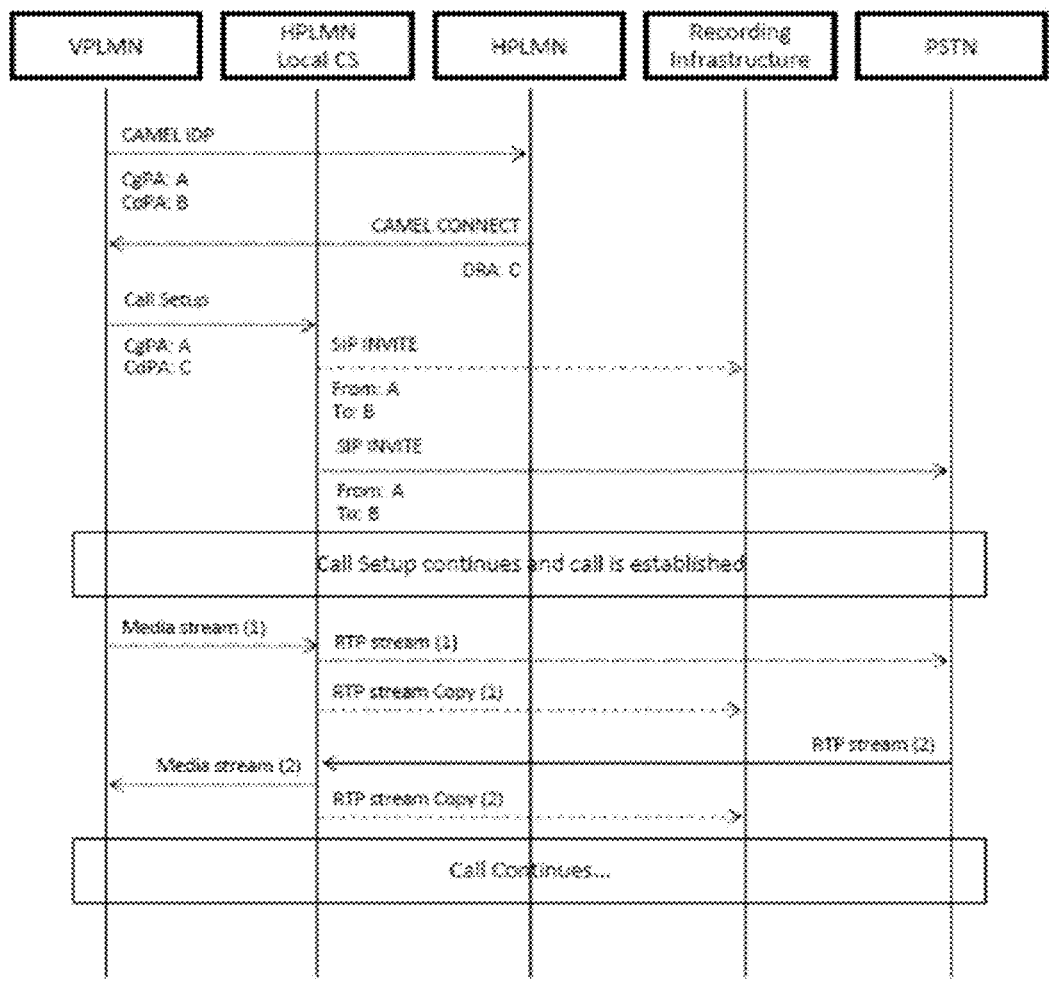
FIG. 4 shows an embodiment of the present invention in which a call is initiated by a mobile telephone.

FIG. 4 shows a ladder diagram for a mobile originating call—that is, a call from the subscriber using a mobile terminal to another party, here shown as using a conventional PSTN, using the approach described above.

First of all, when the call attempt is made by the calling party A to call called party B, the CAMEL initial detection point in the VPLMN (the mobile network currently being visited by party A, the subscriber—assumed not to be the subscriber's home mobile network HPLMN) notifies the service control point of the subscriber's HPLMN of the call. A CAMEL connection is established which allows the service control point of the HPLMN to notify the service control point of the VPLMN of the local call splitter CS to be used to split the call—a destination routing address is given with corresponds to a local temporarily unique service access number (TSAN) for the splitter CS. The HPLMN service control point decides on which TSAN to sue based on the Source Global Title or the Service Key in order to select the nearest CS.

The VPLMN then begins call setup, routing the call first to CS. CS then splits the call and uses SIP to initiate sessions on the two separate channels—one to the recording infrastructure, and the other to the PSTN hosting party B. Call setup then continues in the conventional manner. Media streams are then generated in the course of the call. These may be by any appropriate protocol (for example, ISUP or RTP). In this case, RTP streams are shown. The media stream from the subscriber passes to the splitter CS, where it is split and becomes a first RTP stream which is routed to CS and a first RTP stream copy which is routed to the recording infrastructure. A second RTP stream from the called party is passed to the splitter CS, where it is similarly split into a second RTP stream which is converted to a second media stream and routed to party A and a second RTP stream copy which is routed to the recording infrastructure. This continues until termination of the call.

Figure 5:
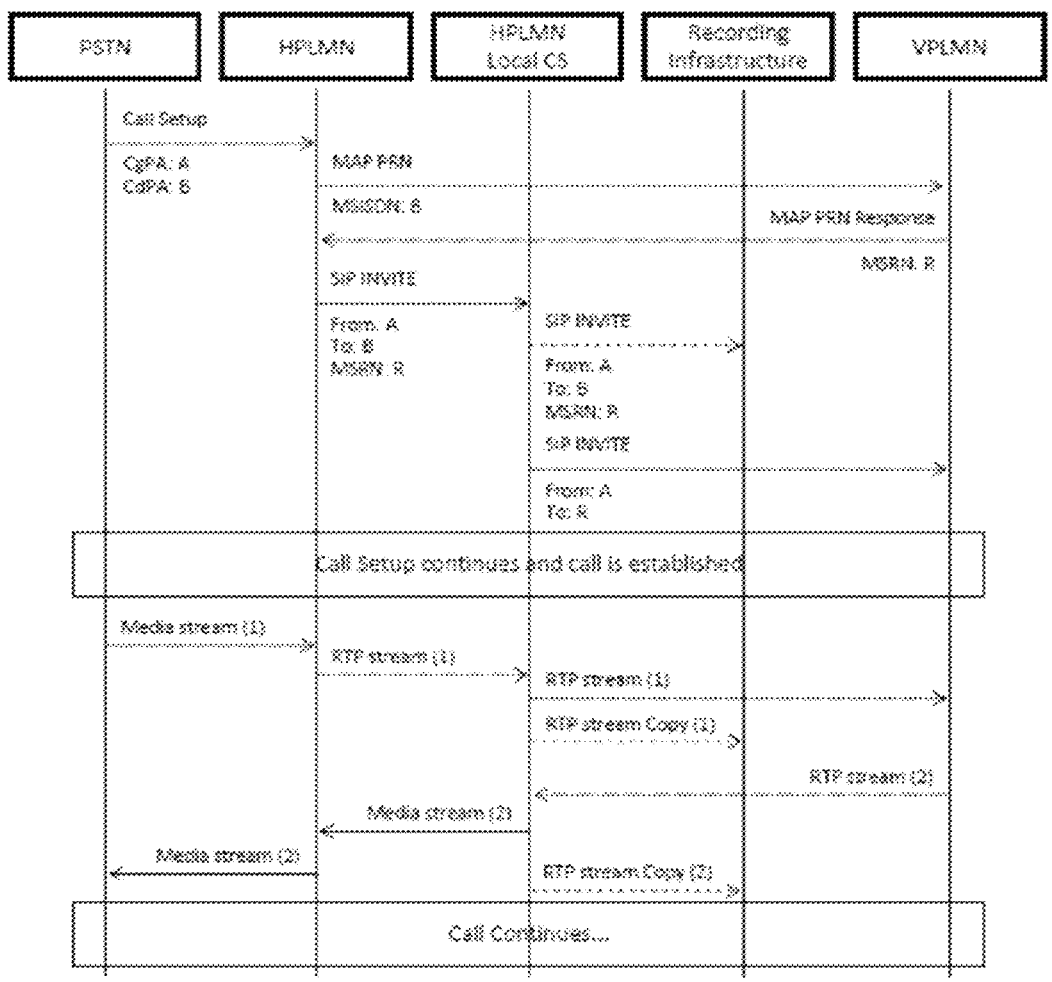
FIG. 5 shows an embodiment of the invention in which a call is terminated at a mobile telephone.

FIG. 5 shows a ladder diagram for a mobile terminated call—that is, a call to the subscriber using a mobile terminal by another party, here shown as using a conventional PSTN, using the approach described above.

In this case, call setup begins at the PSTN with a call to the subscriber's (in this case the called party, party B) HPLMN. The HPLMN asks the VPLMN visited by the subscriber to provide a roaming number (by MAP PRN) for the MSISDN for party B—this MSRN (Mobile Station Roaming Number) is shown as R in FIG. 5. Once the MSRN is established, the service control point of the HPLMN determines the local CS to be used and sends an appropriate SIP invite to the local CS. The local CS then sends two SIP invites to establish sessions with both the recording infrastructure and the subscriber through MSRN R. Call setup then continues in a conventional manner.

As before, media streams may be of any appropriate protocol—in this case, shown as RTP. A first media stream from the calling party is converted to a first RTP stream at the HPLMN, which then routes this stream to the splitter CS. The first RTP stream is routed to the mobile subscriber through the VPLMN, whereas a first RTP stream copy is routed to the recording infrastructure. From the called party, a second RTP stream is routed to the splitter CS. This is then routed to the HPLMN and party A via the PSTN as a second media stream. A second RTP stream copy is routed to the recording infrastructure.

Figure 6:
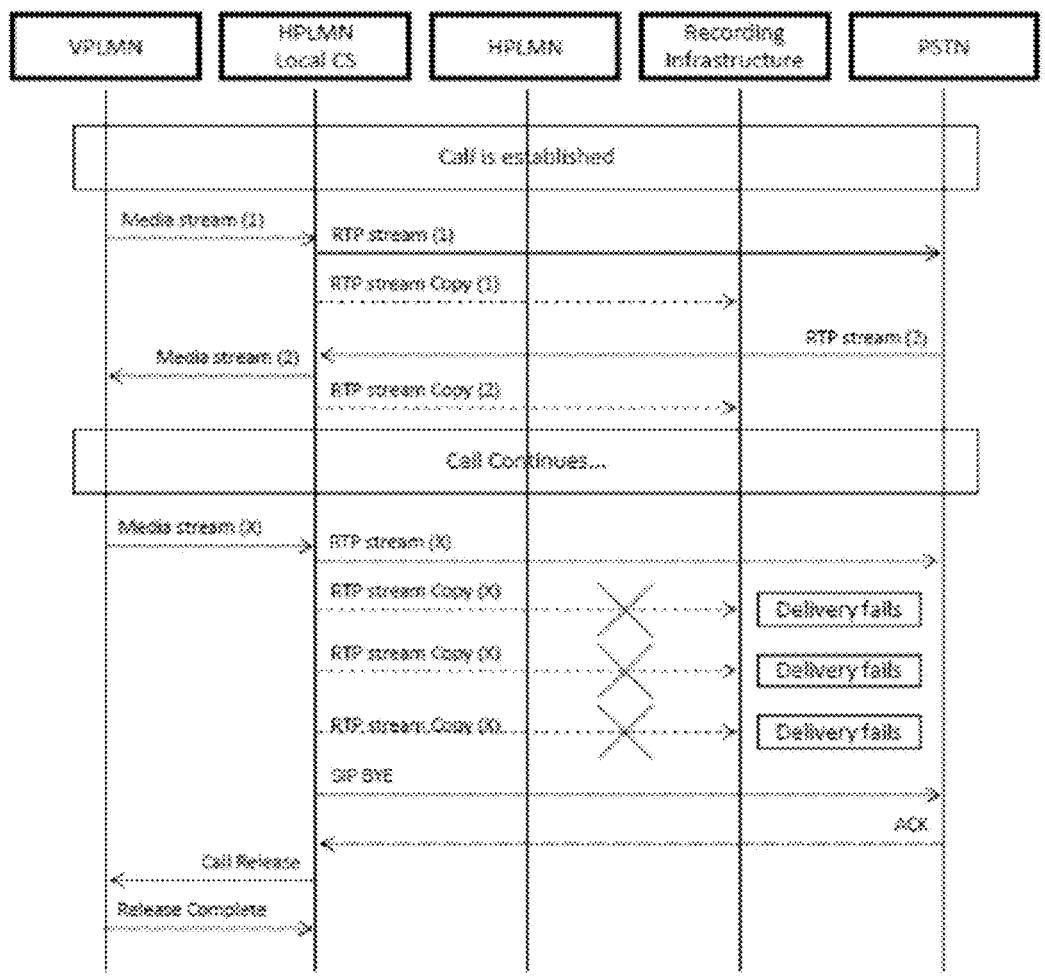
FIG. 6 shows an embodiment of the invention in which the call fails during transmission.

FIG. 6 shows the termination of a call when there is a recording failure—this is shown with respect to the FIG. 4 arrangement, but the skilled person will appreciate that the approach shown here is equally applicable to other calling and network arrangements. The call is initially shown as established, with splitting and routing as shown in FIG. 4. For media stream X, there is a failure which results in failure of the RTP stream copy to the recording infrastructure. This is communicated back to the splitter CS, which then terminates the session with the called party by SIP BYE. On acknowledgement of the SIP BYE, the call splitter CS provides a call release to the VPLMN of the calling party, which provides a release complete. The call release and release complete messages may again be made by any appropriate protocol, such as ISUP or SIP for example.

The ladder diagrams of FIGS. 4 to 6 do not show announcements related to call recording, but these can be provided by the call splitter or by any other suitable network node. These announcements can be added to the streams received by each call. Announcements may be made at the beginning of a call to indicate that call recording is taking place, and may also be used later in the call if required (for example, to indicate that a call will terminate because of recording failure). The owner of the call recording system, or its instantiation for a set of users, may determine whether calls should be allowed to continue if the recording process fails—the approach shown here is that calls will terminate (which would be consistent with a legal obligation to record the call), but in some circumstances it may be appropriate to allow calls to continue.

Although the embodiments described here relate to GSM and CAMEL, embodiments of the invention are not limited either to a specific telecommunications transport technology or to any specific intelligent networking technology. For example, embodiments of the invention may be provided for 4G or CDMA or even a conventional PSTN, and SIP and SS7 signalling may be used to substitute for CAMEL in appropriate networks.

Figure 7:
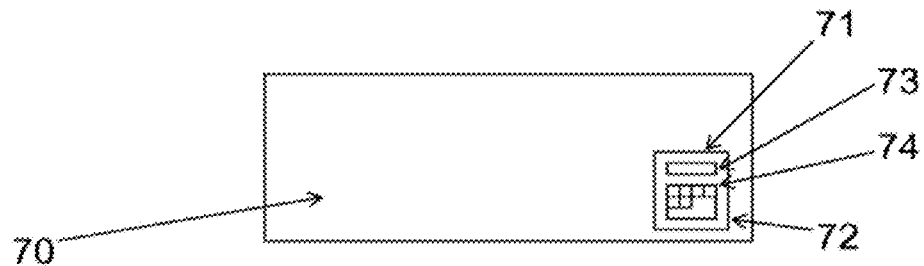
FIG. 7 shows a mobile telecommunications handset and the elements of a SIM.
Figure 8:
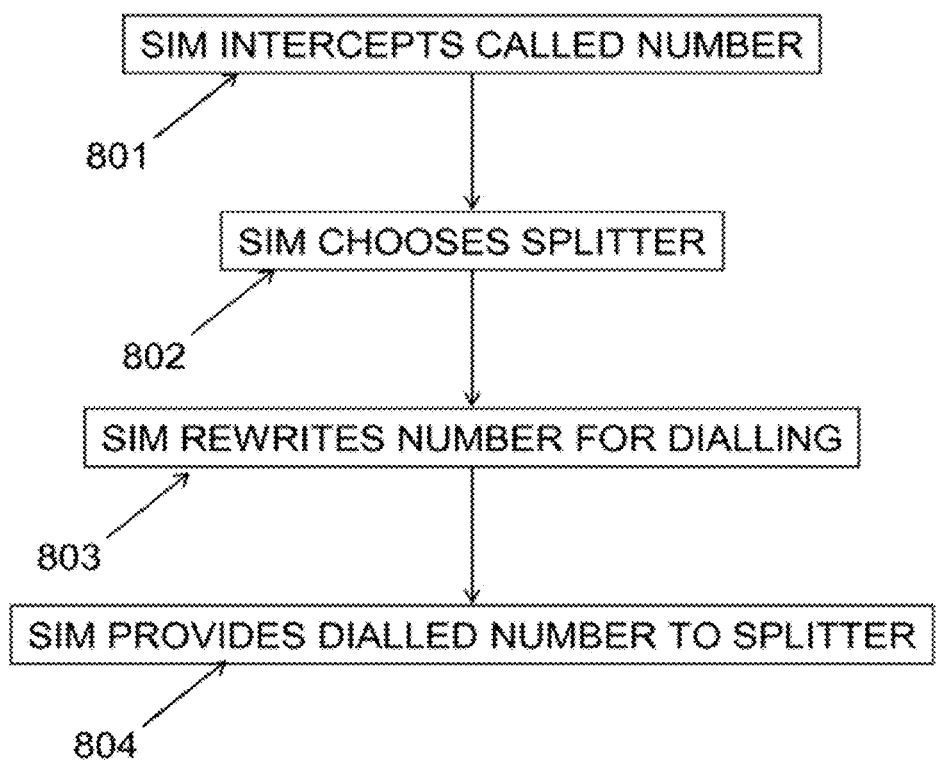
FIG. 8 shows a further embodiment of the invention using SIM functionality.

A still further possibility, shown in FIGS. 7 and 8, is to use information in the SIM of the mobile phone handset instead of intelligent networking. This may be desirable in countries which do not support CAMEL. Where the network is not automatically signalled by the network components of the visited network, an approach can be taken which provides many of the benefits of the approach set out above, particularly those of being largely invisible to the user and incapable of being bypassed.

The handset 70 contains a SIM 71 with a memory 72 and a processor 73, the memory containing a number of applications 74. An application stored in the memory of the SIM and run by its processor may intercept (step 801) all outgoing calls using the CALL CONTROL feature specified by ETSI in TS 102 223. This application is informed of the called number and the current location of the user by the handset during normal operation. A SIM application is configured to use this information to choose (step 802) the optimal splitter directly. This choice may be based on one or more of location, dialled number, customer's subscription type and other information the SIM may know. This information may already be present on the SIM, or the SIM may participate in a dialogue with the central server of the home Network—it first communicates that it has a call to make, and then receives the address of the splitter to route the call to. This information may be stored in memory from a request made at some point in the past been or from a regular update of a routing table. The application on the SIM signals back to the handset to rewrite (step 803) the dialled digits to route the call to the chosen splitter—the handset dials those digits instead of the number dialled by the user so that the call is made to a optimal splitter relay box. The SIM application also passes (step 804) the destination number to the splitter, either directly or via the central communications infrastructure, so that the splitter knows where to route the call. This can be done by a variety of approaches, such as USSD, SMS, post dialled digits or a data signal via the GPRS or similar data channel. As an additional security measure, the SIM may encrypt the number to be dialled using a key known by both the destination splitter and the SIM.

The SIM may communicate with a server to maintain a routing table for these boxes and can determine its own location using the LU commands it receives from the handset. The relay box then operates as described previously to optimise the call path routing.

In this approach, the splitter receives its instruction as to where to route the call directly from the handset or via the central infrastructure. This central infrastructure consists of a standard GSM network core including the necessary signalling means such as Intelligent Network (IN), USSD system, SMS-C or data subsystem. In this context "directly" means over a switched network, but a network endpoint, using an IP address or similar, indicated by the splitter, allowing the handset to logically route directly to this end point.

In embodiments even a handset based application can benefit from the latency reduction methodology described and in this case an application similar to that described for the SIM would run on the handset processor and direct calls via a chosen relay splitter element.

The term territory used herein is intended to mean any specific locality, this may be in terms of countries, regions and possible even for given networks.

The terms mobile phone, handset, mobile terminal, communications device may be considered as being interchangeable within this document.

A person skilled in the art will appreciate that the present invention is not limited to details of the described embodiments, rather numerous changes and modifications may be made without departing from the spirit and scope of the invention as set out in the appended

The invention claimed is:

1. A method of recording media transmitted to or from a first party communicating through one of a plurality of mobile telecommunications networks with a second party, the method comprising:
   either the first party or the second party initiating a call with the other party;
   determining one of a set of call splitters distributed through the plurality of telecommunications networks to be a local call splitter to the first or the second party;
   establishing a connection between the first party and the local call splitter to split the call into a recording part and a call part; wherein the call part is routed between the first party and the second party via the call splitter to provide transmission of media between the first party and the second party; wherein the recording part is provided by the local call splitter to a recording service associated with the first party; wherein the first party is a calling party initiating the voice call, and wherein on initiating the call, a messaging service centre of the mobile telecommunications network to which the first party is attached notifies a service point of that mobile telecommunications network, which notifies the service point of the first party's home mobile telecommunications network.

2. A method of recording media transmitted to or from a first party communicating through one of a plurality of mobile telecommunications networks with a second party, the method comprising:
   either the first party or the second party initiating a call with the other party;
   determining one of a set of call splitters distributed through the plurality of telecommunications networks to be a local call splitter to the first or the second party;
   establishing a connection between the first party and the local call splitter to split the call into a recording part and a call part; wherein the call part is routed between the first party and the second party via the call splitter to provide transmission of media between the first party and the second party; wherein the recording part is provided by the local call splitter to a recording service associated with the first party; wherein the first party is a called party receiving the voice call, and wherein on initiation of the call, the messaging service centre of the first party's home mobile telecommunications network notifies the local call splitter while establishing the call to a mobile telecommunications network visited by the first party.

* * * * *